United States Patent
Hatanaka et al.

(10) Patent No.: US 12,350,994 B2
(45) Date of Patent: Jul. 8, 2025

(54) SUSPENSION AND OFF-ROAD VEHICLE

(71) Applicant: KAWASAKI MOTORS, LTD., Hyogo (JP)

(72) Inventors: Tatsuya Hatanaka, Akashi (JP); Takashi Hisamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/089,665

(22) Filed: Dec. 28, 2022

(65) Prior Publication Data

US 2024/0217291 A1 Jul. 4, 2024

(51) Int. Cl.
*B60G 7/00* (2006.01)
*B60G 3/20* (2006.01)

(52) U.S. Cl.
CPC .............. *B60G 7/008* (2013.01); *B60G 3/20* (2013.01); *B60G 7/001* (2013.01); *B60G 2200/144* (2013.01); *B60G 2204/1224* (2013.01); *B60G 2204/129* (2013.01); *B60G 2204/148* (2013.01); *B60G 2204/43* (2013.01); *B60G 2300/07* (2013.01)

(58) Field of Classification Search
CPC .... B60G 7/008; B60G 3/20; B60G 2200/144; B60G 2204/129; B60G 2204/148; B60G 2300/07; B60G 2200/17; B60G 2204/1224; B60G 2204/43
See application file for complete search history.

(56) References Cited

U.S. PATENT DOCUMENTS

| | | | | |
|---|---|---|---|---|
| 3,422,918 A * | 1/1969 | Musser, Jr. | ............... | B60G 3/24 267/221 |
| 4,641,854 A * | 2/1987 | Masuda | ................. | B60G 7/001 180/385 |
| 4,786,075 A * | 11/1988 | Takahashi | ................ | B60G 3/24 180/254 |
| 4,982,978 A * | 1/1991 | Kawasaki | ................ | B60G 3/26 280/124.171 |
| 5,421,606 A * | 6/1995 | Chun | ....................... | B60G 3/20 280/124.141 |
| 5,697,633 A * | 12/1997 | Lee | .......................... | B60G 3/26 280/124.136 |
| 5,782,484 A * | 7/1998 | Kuhn, Jr. | ............... | B60G 3/265 267/248 |
| 5,845,926 A * | 12/1998 | Davis | ....................... | B60G 3/26 280/124.136 |
| 5,992,868 A * | 11/1999 | Orimoto | ................... | B60G 3/26 280/124.138 |
| 6,070,689 A * | 6/2000 | Tanaka | ..................... | B60K 5/00 180/291 |
| 6,109,631 A * | 8/2000 | Jones | ..................... | B62D 21/11 280/124.136 |

(Continued)

Primary Examiner — Timothy Wilhelm
(74) Attorney, Agent, or Firm — XSENSUS LLP (57) ABSTRACT

A suspension 4 includes a suspension arm 41 that couples a knuckle 3 to a vehicle body frame 1, and a shock absorber 42 that is attached to the suspension arm 41. The suspension arm 41 includes a lower arm 5 and an upper arm 6 located higher than the lower arm 5. The upper arm 6 has a front arm 61 and a rear arm 62 located at the rear with respect to the front arm 61. A lower end 42a of the shock absorber 42 is attached to one of the front arm 61 or the rear arm 62.

9 Claims, 8 Drawing Sheets

(56) References Cited

U.S. PATENT DOCUMENTS

| | | | | |
|---|---|---|---|---|
| 6,398,240 B1* | 6/2002 | Taylor | B60T 1/065 | 280/93.511 |
| 6,431,569 B2* | 8/2002 | Handa | B60G 3/20 | 280/124.138 |
| 6,767,022 B1* | 7/2004 | Chevalier | B62K 5/01 | 280/124.136 |
| 7,004,484 B1* | 2/2006 | Chevalier | B60G 7/02 | 280/124.136 |
| 7,441,788 B2* | 10/2008 | Leclair | B62K 5/01 | 280/124.135 |
| 7,571,918 B2* | 8/2009 | Bowers | B60G 7/001 | 280/124.135 |
| 7,618,063 B2* | 11/2009 | Takeshima | B62K 5/01 | 180/311 |
| 7,744,104 B2* | 6/2010 | Kuwabara | B60G 3/20 | 280/124.134 |
| 7,748,491 B2* | 7/2010 | Seki | B60K 17/24 | 74/606 R |
| 7,845,452 B2* | 12/2010 | Bennett | B60B 3/142 | 180/376 |
| 7,896,371 B2* | 3/2011 | Matsuura | B62K 5/01 | 180/311 |
| 7,934,735 B2* | 5/2011 | Kuwabara | B60G 7/001 | 280/124.135 |
| 7,954,835 B2* | 6/2011 | Nakamura | B60G 3/20 | 280/124.135 |
| 8,079,602 B2* | 12/2011 | Kinsman | B62D 21/14 | 280/5.512 |
| 8,382,130 B2* | 2/2013 | Nakamura | B60G 3/20 | 280/5.521 |
| 8,444,160 B2* | 5/2013 | Okamoto | B60G 3/20 | 280/124.135 |
| 8,459,671 B2* | 6/2013 | Kuwabara | F16F 1/3735 | 180/374 |
| 8,714,574 B2* | 5/2014 | Glanzer | B60G 7/006 | 280/124.136 |
| 9,102,205 B2* | 8/2015 | Kvien | B60G 3/20 | |
| 9,238,391 B1* | 1/2016 | Luttinen | B60G 11/181 | |
| 9,242,672 B2* | 1/2016 | Brady | B62D 21/11 | |
| 9,421,955 B2* | 8/2016 | Kuwabara | F16C 11/06 | |
| 9,428,031 B2* | 8/2016 | Kuwabara | B60G 7/008 | |
| 9,505,283 B2* | 11/2016 | Kuwabara | B60G 7/001 | |
| 9,539,871 B2* | 1/2017 | Suzuki | B60G 13/005 | |
| 9,545,976 B2* | 1/2017 | Melcher | B62M 27/02 | |
| 9,616,933 B2* | 4/2017 | Tanaka | B60G 7/02 | |
| 9,776,466 B2* | 10/2017 | Battaglia | B60G 3/18 | |
| 9,815,346 B2* | 11/2017 | Suzuki | B60K 5/00 | |
| 9,849,743 B2* | 12/2017 | Kuwabara | B60G 7/001 | |
| 9,884,647 B2* | 2/2018 | Peterson | B62D 21/11 | |
| 9,944,142 B2* | 4/2018 | Mohrlock | B60G 3/20 | |
| 9,981,519 B2* | 5/2018 | Despres-Nadeau | B60N 2/38 | |
| 10,315,696 B2* | 6/2019 | Gordon | B60G 17/00 | |
| 10,399,401 B2* | 9/2019 | Schlangen | B62D 1/163 | |
| 10,442,458 B2* | 10/2019 | Heon | B62D 3/12 | |
| 10,633,021 B2* | 4/2020 | Gordon | B60B 27/0052 | |
| 10,737,547 B2 | 8/2020 | Deckard et al. | | |
| 10,793,181 B2* | 10/2020 | Bennett | B62D 39/00 | |
| 10,821,794 B2* | 11/2020 | Nakashima | B60G 3/20 | |
| 10,946,736 B2* | 3/2021 | Fischer | B60K 11/04 | |
| 11,014,421 B2* | 5/2021 | Booth | B60K 17/165 | |
| 11,192,414 B1* | 12/2021 | Berardi | B62K 25/24 | |
| 11,571,939 B2* | 2/2023 | Berardi | B60G 3/18 | |
| 11,643,035 B2* | 5/2023 | Kotrla | B60G 3/20 | 293/117 |
| 2001/0048207 A1* | 12/2001 | Handa | B60G 21/026 | 280/124.135 |
| 2004/0195018 A1* | 10/2004 | Inui | B62D 3/12 | 180/68.1 |
| 2007/0074925 A1* | 4/2007 | Seki | B62K 5/01 | 180/370 |
| 2007/0170682 A1* | 7/2007 | Kinugasa | B60G 3/20 | 280/124.135 |
| 2007/0176387 A1* | 8/2007 | Tsuruta | B60G 11/15 | 280/124.135 |
| 2007/0256659 A1* | 11/2007 | Anderson | A63H 17/262 | 123/198 R |
| 2009/0133950 A1* | 5/2009 | Takemura | E02F 9/0866 | 180/367 |
| 2011/0048833 A1* | 3/2011 | Schapf | B60G 7/006 | 280/124.128 |
| 2012/0018973 A1* | 1/2012 | Fujii | B60G 3/20 | 280/124.134 |
| 2012/0223500 A1* | 9/2012 | Kinsman | B62D 27/065 | 180/312 |
| 2014/0090935 A1* | 4/2014 | Pongo | B60K 5/02 | 188/18 A |
| 2014/0225357 A1* | 8/2014 | Shinbori | B60R 21/13 | 280/771 |
| 2014/0265202 A1* | 9/2014 | Bunker | B60G 3/20 | 280/93.512 |
| 2016/0089945 A1* | 3/2016 | Kuwabara | B60G 7/001 | 280/124.117 |
| 2018/0170134 A1* | 6/2018 | Schlangen | B60G 15/067 | |
| 2018/0281538 A1* | 10/2018 | Gordon | B62K 7/22 | |
| 2018/0281539 A1* | 10/2018 | Gordon | B62D 27/023 | |
| 2018/0281540 A1* | 10/2018 | Gordon | B62D 21/12 | |
| 2018/0290511 A1* | 10/2018 | Gordon | B62D 3/02 | |
| 2020/0010114 A1* | 1/2020 | Gordon | B62D 7/20 | |
| 2020/0148019 A1* | 5/2020 | McConville | B60G 3/20 | |
| 2021/0070354 A1* | 3/2021 | Eaton | B60G 7/001 | |
| 2021/0339591 A1* | 11/2021 | Li | B60G 3/20 | |

* cited by examiner

SUSPENSION AND OFF-ROAD VEHICLE

FIELD

The technique disclosed herein relates to a suspension and an off-road vehicle.

BACKGROUND

U.S. patent Ser. No. 10/737,547 discloses a suspension including a shock absorber attached to a suspension arm. The suspension arm has a lower arm and an upper arm located higher than the lower arm. The upper arm has a front arm and a rear arm located at the rear with respect to the front arm. A lower end of the shock absorber is positioned between the front arm and the rear arm.

SUMMARY

In the suspension, a great load acts on the shock absorber. Reactive force from the shock absorber acts on a portion of the suspension arm to which the shock absorber is attached. For this reason, for the suspension arm, it has been demanded that the suspension arm supports, with a high stiffness, the shock absorber.

The technique disclosed herein has been made in view of the above-described point, and an object thereof is to improve the stiffness for supporting the shock absorber.

A suspension disclosed herein includes a suspension arm that couples a knuckle to a vehicle body frame, and a shock absorber that is attached to the suspension arm. The suspension arm includes a lower arm and an upper arm located higher than the lower arm. The upper arm has a front arm and a rear arm located at a rear with respect to the front arm. A lower end of the shock absorber is attached to one of the front arm or the rear arm.

An off-road vehicle disclosed herein includes a front wheel, a knuckle that supports the front wheel, and a suspension that couples the knuckle to a vehicle body frame. The suspension includes a suspension arm that couples the knuckle to the vehicle body frame, and a shock absorber that is attached to the suspension arm. The suspension arm has a lower arm and an upper arm located higher than the lower arm. The upper arm has a front arm and a rear arm located at the rear with respect to the front arm. A lower end of the shock absorber is attached to one of the front arm or the rear arm.

The stiffness of the suspension for supporting the shock absorber can be improved.

The stiffness of the off-road vehicle for supporting the shock absorber can be improved.

DESCRIPTION OF EMBODIMENTS

Figure 1:
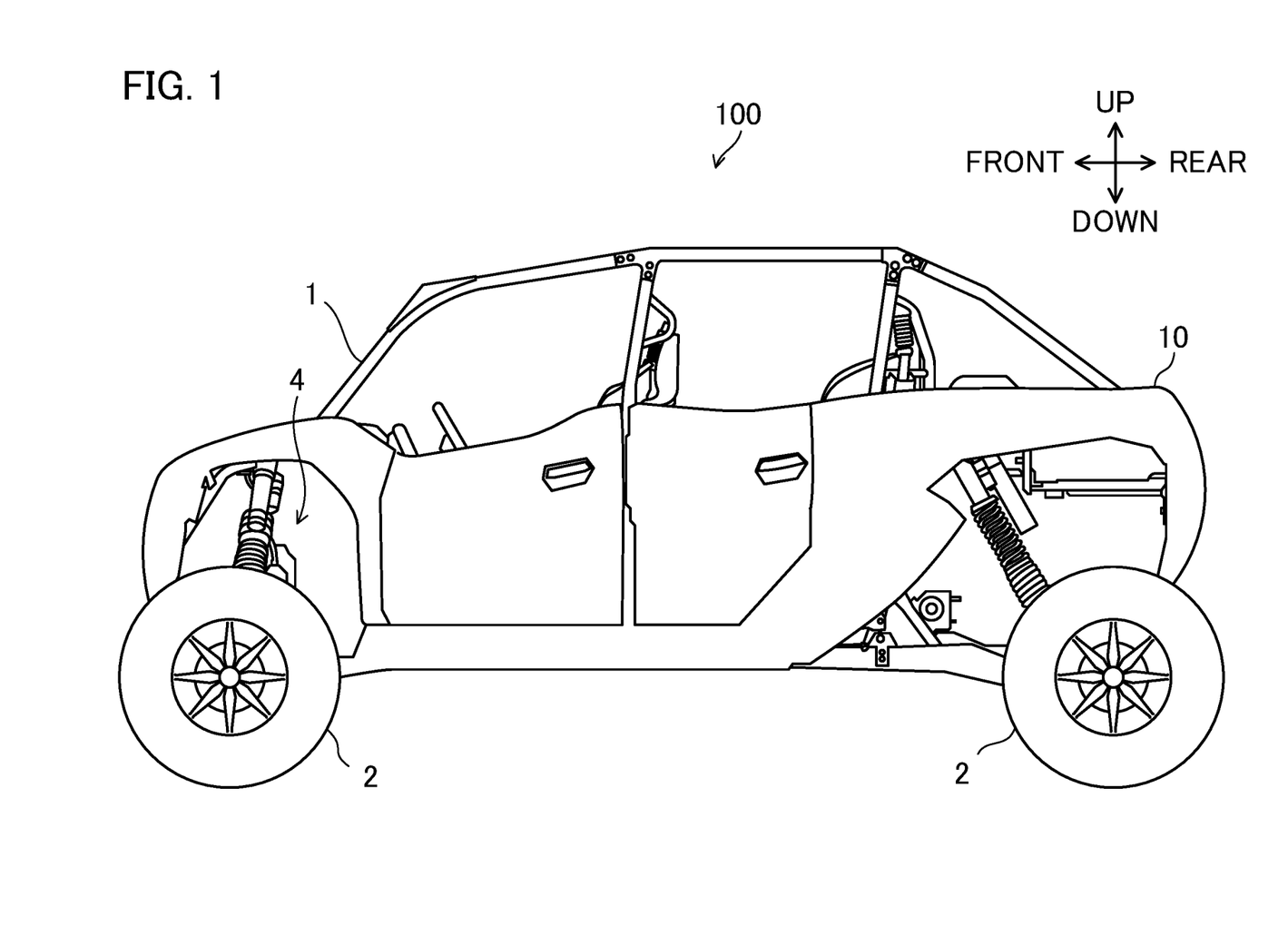
FIG. 1 is a side view of a utility vehicle.

Hereinafter, an exemplary embodiment will be described based on the drawings. FIG. 1 is a side view of a utility vehicle 100. The utility vehicle 100 can travel off rod. The utility vehicle 100 is one example of an off-road vehicle. Hereinafter, the utility vehicle 100 will also be merely referred to as a "vehicle 100."

In the present disclosure, each element of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction."

The vehicle 100 includes a vehicle body frame 1, wheels 2, knuckles 3 supporting the wheels 2, and suspensions 4 coupling the knuckles 3 to the vehicle body frame 1. The vehicle 100 may further include an outer panel 10. The wheels 2 include right and left front wheels 2 and right and left rear wheels 2. That is, the vehicle 100 is a four-wheeled vehicle. In the vehicle 100, the front wheels 2 and the peripheral structures thereof are basically bilaterally symmetrical. The suspensions 4 applied to the right and left front wheels 2 have the same configuration. Hereinafter, the left front wheel 2 and the peripheral structure thereof will be described.

Figure 2:
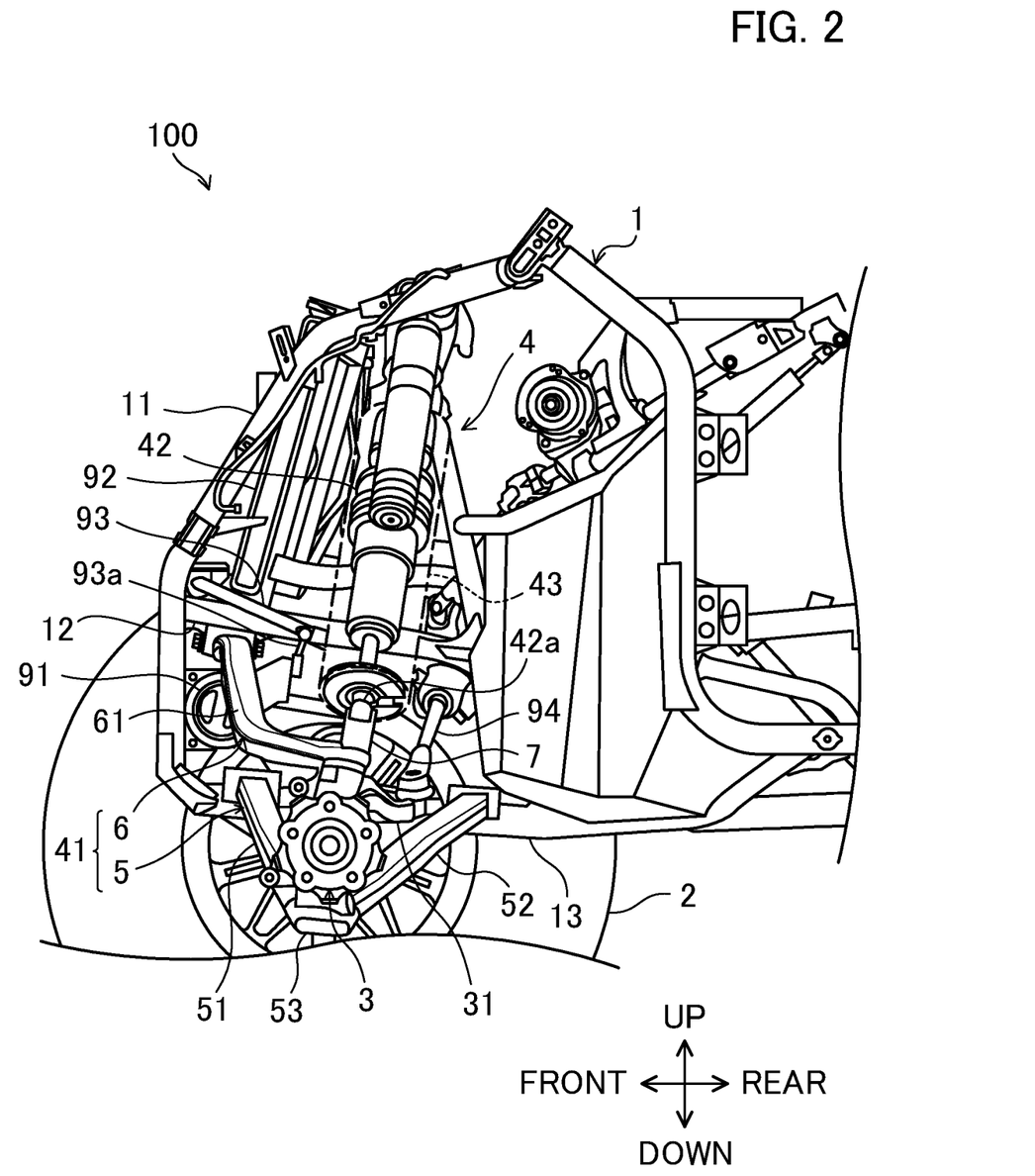
FIG. 2 is a side view of a front portion of the partially-disassembled utility vehicle.
Figure 3:
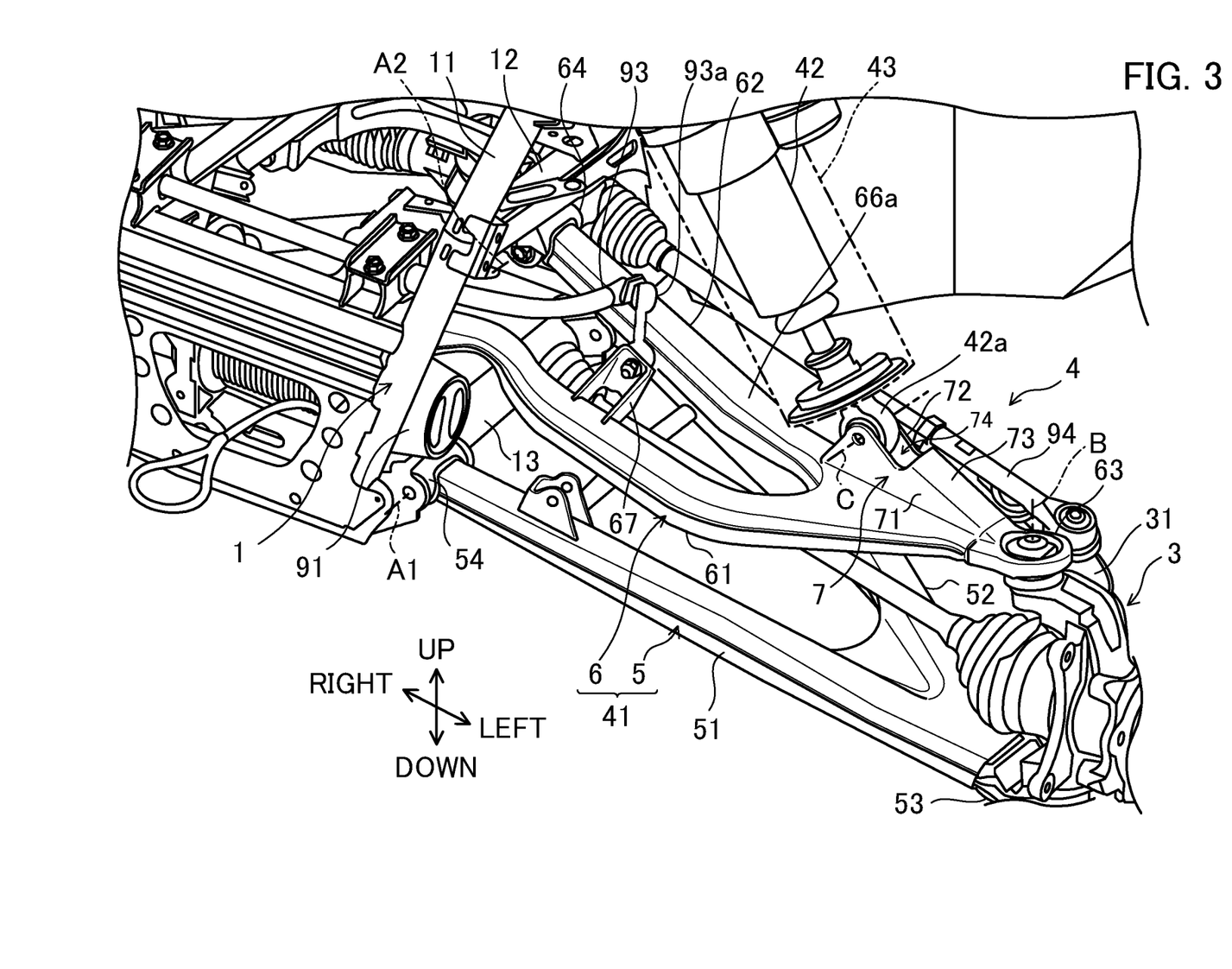
FIG. 3 is a perspective view of the front portion of the partially-disassembled utility vehicle.

FIG. 2 is a side view of a front portion of the partially-disassembled utility vehicle 100. FIG. 3 is a perspective view of the front portion of the partially-disassembled utility vehicle 100. The vehicle body frame 1 includes a first frame 11 extending substantially in an up-down direction, a second frame 12 extending substantially rearward from an intermediate portion of the first frame 11 in the up-down direction, and a third frame 13 extending substantially rearward from a lower end of the first frame 11. The vehicle body frame 1 is formed, for example, of a metal pipe.

As shown in FIGS. 2 and 3, accessories are located inside the vehicle body frame 1 at the front portion of the vehicle 100. The accessories include, for example, a winch 91, a radiator 92, and a stabilizer 93. The winch 91, the radiator 92, and the stabilizer 93 are attached to the vehicle body frame 1.

For example, the winch 91 is located between the second frame 12 and the third frame 13, and is attached to the first frame 11. The radiator 92 is located at a position higher than the second frame 12, and is attached to the first frame 11 and the second frame 12. The stabilizer 93 is located at a position higher than the second frame 12. An intermediate portion of the stabilizer 93 extends substantially in the vehicle width direction. Both end portions of the stabilizer 93 are bent rearward, and are coupled to the suspensions 4 via links 93a. Note that in FIG. 3, the radiator 92 is not shown.

Figure 4:
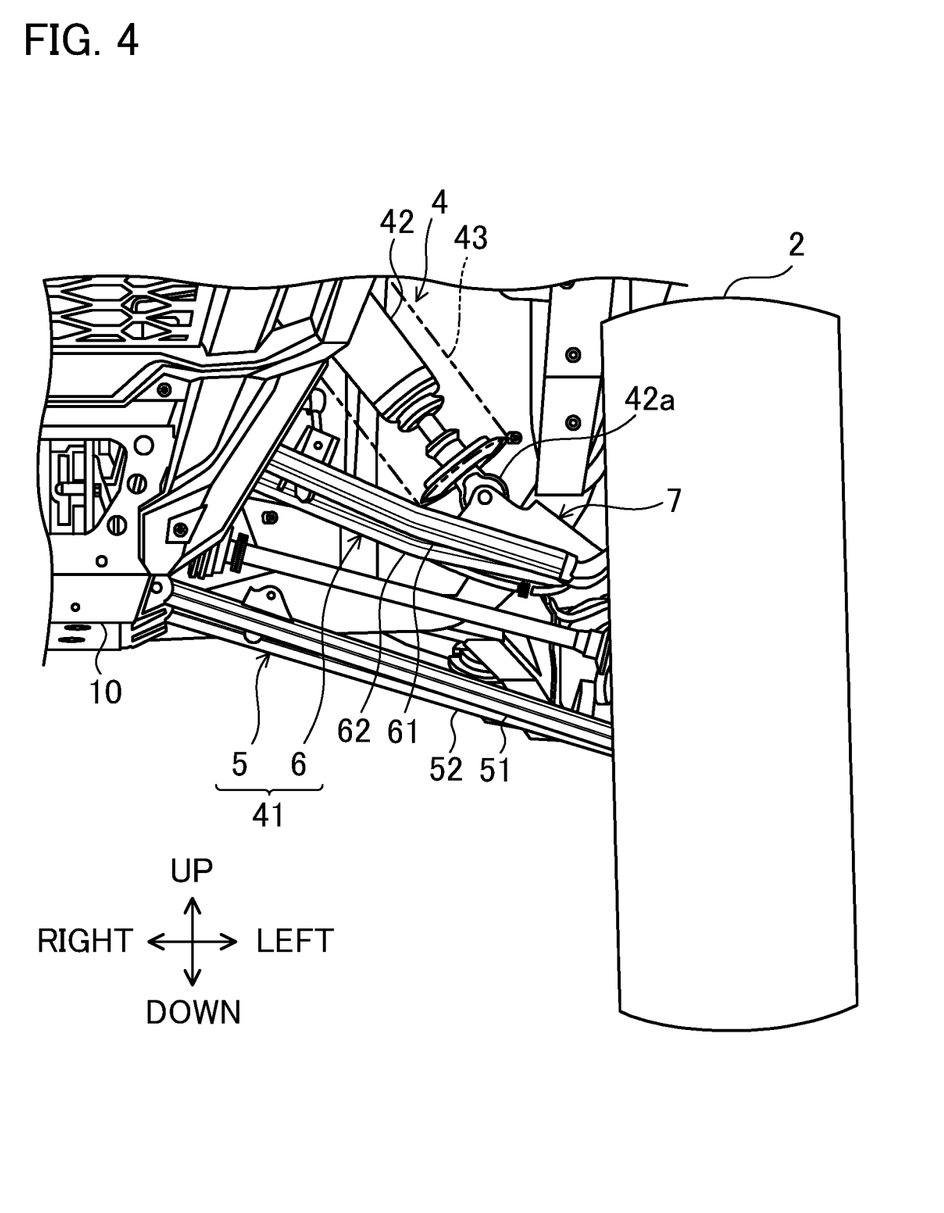
FIG. 4 is a front view of the utility vehicle showing a left front wheel and the periphery thereof.
Figure 5:
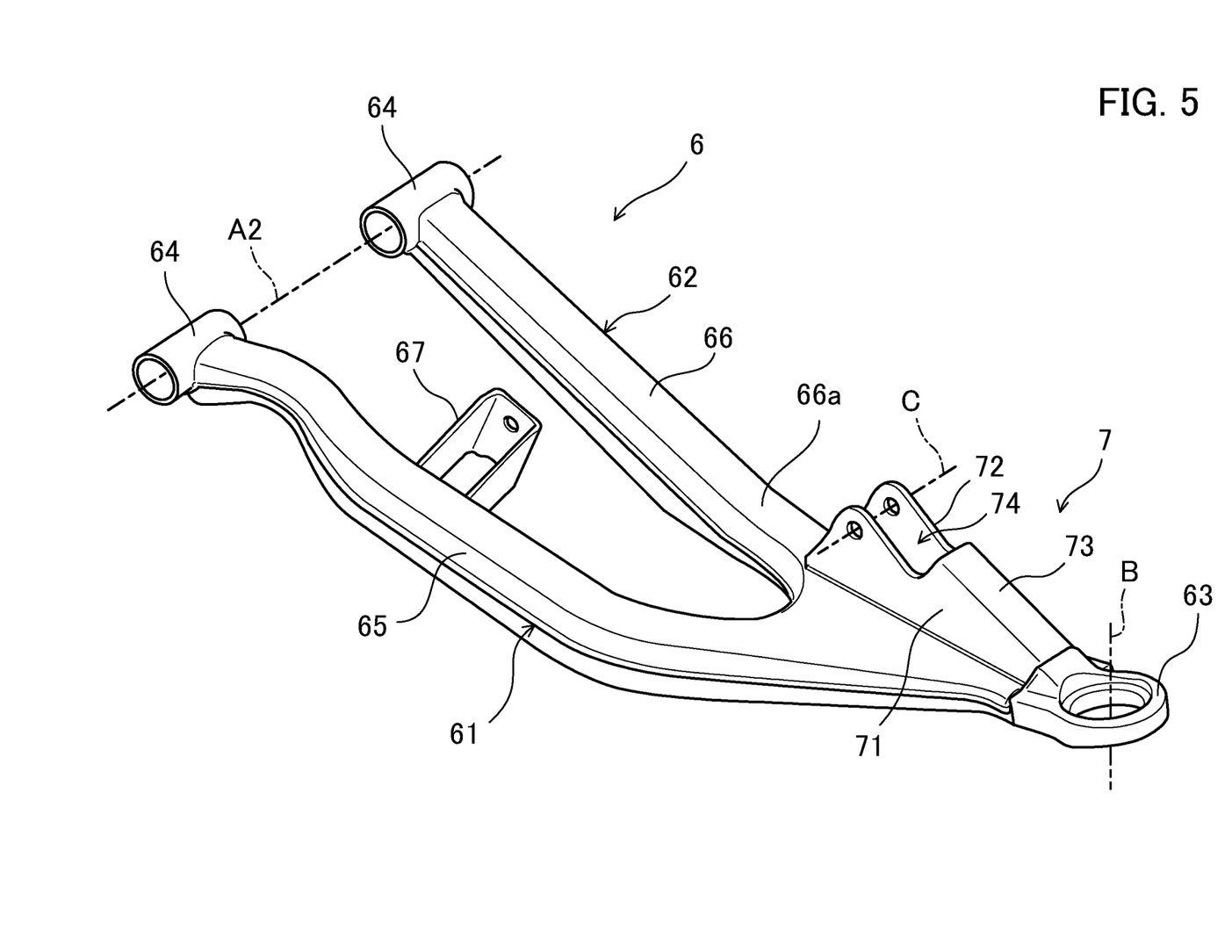
FIG. 5 is a perspective view of an upper arm.

The suspension 4 buffers impact and vibration transmitted from a rod surface to the vehicle body frame 1. The suspension 4 is a front suspension that suspends the front wheel 2. As shown in FIGS. 3 to 5, the suspension 4 has a suspension arm 41 coupling the knuckle 3 to the vehicle body frame 1 and a shock absorber 42 attached to the suspension arm 41. The suspension arm 41 extends downward diagonally from the vehicle body frame 1 toward the knuckle 3. The suspension arm 41 swings relative to the vehicle body frame 1. The suspension 4 may further have a coil spring 43.

The suspension arm 41 includes a lower arm 5 and an upper arm 6 located higher than the lower arm 5. Each of the lower arm 5 and the upper arm 6 entirely extends in the vehicle width direction. An inner end of the lower arm 5 in the vehicle width direction is attached to the third frame 13 so as to rotate about a rotation axis extending substantially in the front-rear direction. An inner end of the upper arm 6 in the vehicle width direction is attached to the second frame 12 so as to rotate about a rotation axis extending substantially in the front-rear direction. An outer end of the lower arm 5 in the vehicle width direction and an outer end of the upper arm 6 in the vehicle width direction are attached to the knuckle 3. The lower arm 5 and the upper arm 6 swing relative to the vehicle body frame 1. In response to swing of the lower arm 5 and the upper arm 6, the knuckle 3 and the wheel 2 swing substantially in the up-down direction. Each of the lower arm 5 and the upper arm 6 is made of metal. For example, each of the lower arm 5 and the upper arm 6 is in a hollow shape. In this example, each of the lower arm 5 and the upper arm 6 is formed in such a manner that two divided bodies are joined to each other with a hollow internal space therein. Hereinafter, unless otherwise specified, an inner end in the vehicle width direction will be merely referred to as an "inner end," and an outer end in the vehicle width direction will be merely referred to as an "outer end."

The lower arm 5 includes a front arm 51 and a rear arm 52 located at the rear with respect to the front arm 51. The front arm 51 and the rear arm 52 entirely extend in the vehicle width direction. Specifically, the front arm 51 and the rear arm 52 do not extend in parallel with each other, but the rear arm 52 is inclined with respect to the front arm 51. The inner end of the front arm 51 and the inner end of the rear arm 52 are separated from each other. The outer end of the front arm 51 and the outer end of the rear arm 52 are integrally joined to each other. That is, the lower arm 5 has one first arm end 53 at which the outer end of the front arm 51 and the outer end of the rear arm 52 are joined to each other and two second arm ends 54 (in FIG. 3, only one second arm end 54 is shown) which are the inner end of the front arm 51 and the inner end of the rear arm 52. The lower arm 5 is a so-called A-arm. That is, the first arm end 53 is the outer end of the lower arm 5, and the second arm ends 54 are the inner ends of the lower arm 5.

The first arm end 53 is in a ring shape having the center axis extending substantially in the up-down direction. The two second arm ends 54 are separated from each other substantially in the front-rear direction. The two second arm ends 54 are attached to the third frame 13 so as to rotate about a rotation axis A1 extending substantially in the front-rear direction. More specifically, the second arm end 54 is in a cylindrical shape with the rotation axis A1 as a center axis. The lower arm 5 swings about the rotation axis A1 relative to the third frame 13.

The upper arm 6 includes a front arm 61 and a rear arm 62 located at the rear with respect to the front arm 61. The front arm 61 and the rear arm 62 entirely extend in the vehicle width direction. Specifically, the front arm 61 and the rear arm 62 do not extend in parallel with each other, but the rear arm 62 is inclined with respect to the front arm 61. More specifically, as viewed in plane, the rear arm 62 extends substantially in the vehicle width direction. The front arm 61 is inclined rearward toward the outer side in the vehicle width direction. The inclination angle of the front arm 61 with respect to the vehicle width direction is smaller than the inclination angle of the rear arm 62 with respect to the vehicle width direction. The inner end of the front arm 61 and the inner end of the rear arm 62 are separated from each other. The outer end of the front arm 61 and the outer end of the rear arm 62 are integrally joined to each other. That is, the upper arm 6 has one first arm end 63 at which the outer end of the front arm 61 and the outer end of the rear arm 62 are joined to each other and two second arm ends 64 (in FIG. 3, only one second arm end 64 is shown) which are the inner end of the front arm 61 and the inner end of the rear arm 62. The upper arm 6 is a so-called A-arm. That is, the first arm end 63 is the outer end of the upper arm 6, and the second arm ends 64 are the inner ends of the upper arm 6.

The first arm end 63 is in a ring shape having the center axis extending substantially in the up-down direction. The two second arm ends 64 are separated from each other substantially in the front-rear direction. The two second arm ends 64 are attached to the second frame 12 so as to rotate about a rotation axis A2 extending substantially in the front-rear direction. More specifically, the second arm end 64 is in a cylindrical shape with the rotation axis A2 as a center axis. The upper arm 6 swings about the rotation axis A2 relative to the second frame 12. The rotation axis A2 is substantially parallel with the rotation axis A1. In terms of a position in the front-rear direction, the second arm end 64 of the rear arm 62 is positioned at the front with respect to the second arm end 54 of the rear arm 52 of the lower arm 5. In terms of a position in the front-rear direction, the second arm end 64 of the front arm 61 is substantially at the same position as that of the second arm end 54 of the front arm 51 of the lower arm 5.

The front arm 61 has a bracket 67 to which the stabilizer 93 is attached. Specifically, the bracket 67 is joined to a portion of the front arm 61 between the first arm end 63 and the second arm end 64. An end portion of the stabilizer 93 is attached to the bracket 67 via the link 93a.

The knuckle 3 supports the front wheel 2 via a hub and a hub bearing. The knuckle 3 is supported by the lower arm 5 and the upper arm 6. Specifically, the first arm end 53 of the lower arm 5 supports a lower portion of the knuckle 3. The first arm end 63 of the upper arm 6 supports an upper portion of the knuckle 3. The lower arm 5 and the upper arm 6 support the knuckle 3 such that the knuckle 3 is rotatable about a rotation axis B extending substantially in the up-down direction.

The knuckle 3 has a knuckle arm 31. The knuckle arm 31 extends substantially rearward. A steering tie rod 94 is attached to the knuckle arm 31 so as to rotate about a rotation axis substantially parallel with the rotation axis B. The steering tie rod 94 is attached to the knuckle arm 31 at a position at the rear with respect to the rotation axis B.

The steering tie rod 94 extends outward in the vehicle width direction from a steering gear box located on the vehicle body frame 1. The steering tie rod 94 extends and contracts according to steering operation. The knuckle 3 rotates about the rotation axis B in response to extension and contraction of the steering tie rod 94. Accordingly, the direction of the front wheel 2 changes.

The shock absorber 42 is, for example, an air cylinder or a hydraulic cylinder. The shock absorber 42 couples the vehicle body frame 1 and the suspension arm 41 to each other. The coil spring 43 is attached to the periphery of the shock absorber 42. The coil spring 43 elastically couples the vehicle body frame 1 and the suspension arm 41 to each other. FIG. 4 is a front view of the vehicle 100 showing the left front wheel 2 and the periphery thereof. As shown in FIG. 4, under action of the static load of the vehicle 100, the lower arm 5 and the upper arm 6 are inclined downward toward the outer side in the vehicle width direction. When the front wheel 2 receives impact from the road surface, the impact is transmitted to the shock absorber 42 and the coil spring 43 via the suspension arm 41. The shock absorber 42 and the coil spring 43 absorb and damp such impact. Accordingly, the impact and vibration transmitted to the vehicle body frame 1 are buffered.

Subsequently, a detailed configuration of the suspension 4 will be described.

The shock absorber 42 is attached to the rear arm 62 among the front arm 61 and the rear arm 62. The shock absorber 42 is located higher than the rear arm 62. That is, a lower end 42a of the shock absorber 42 is attached to the rear arm 62. The rear arm 62 has an arm body 66 and a bracket 7 to which the lower end 42a of the shock absorber 42 is attached.

Figure 6:
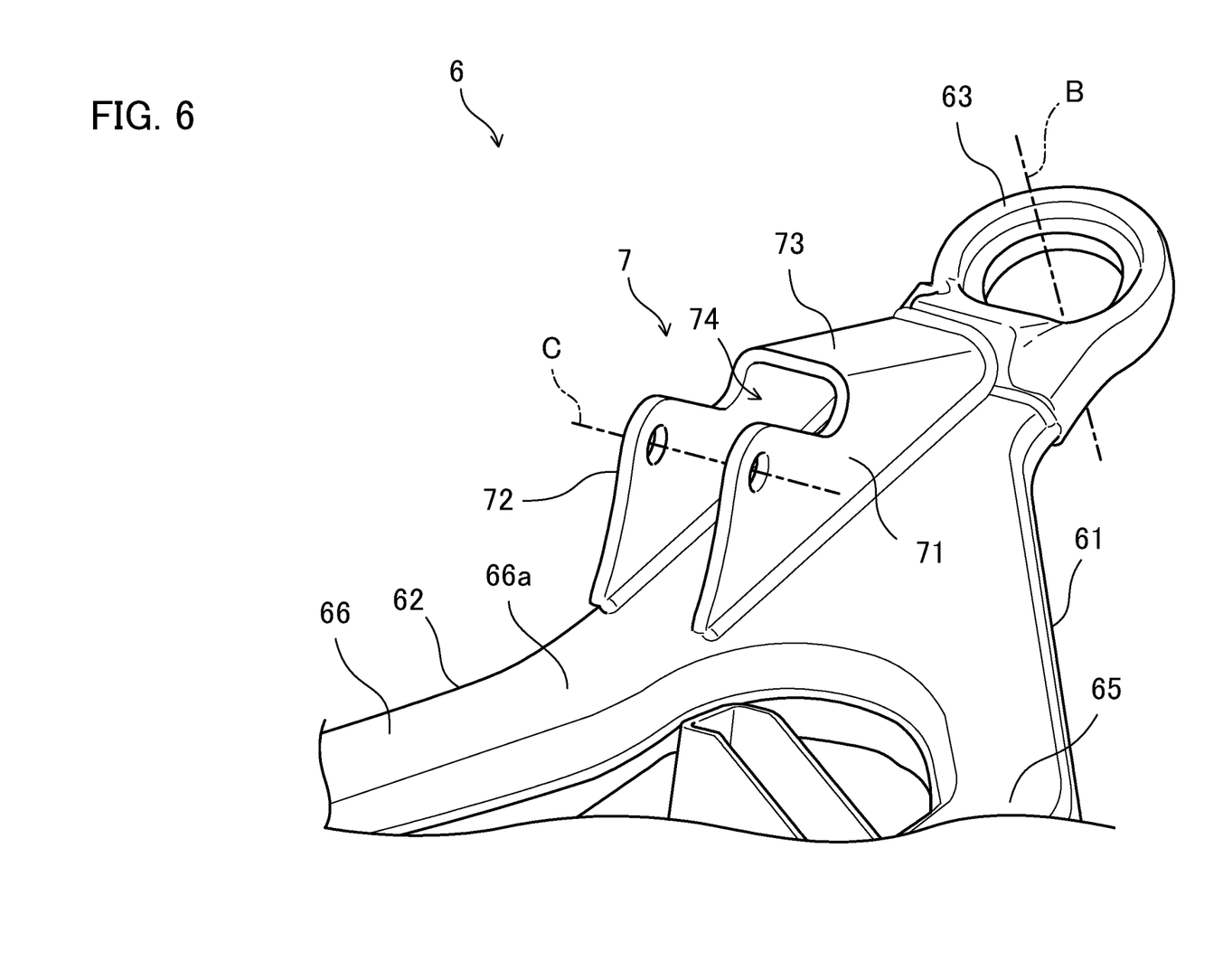
FIG. 6 is a partially-enlarged perspective view of the upper arm.

FIG. 5 is a perspective view of the upper arm 6. FIG. 6 is a partially-enlarged perspective view of the upper arm 6. Specifically, the front arm 61 further has, in addition to the first arm end 63 and the second arm end 64, an arm body 65 extending substantially in the vehicle width direction and joined to the first arm end 63 and the second arm end 64. The rear arm 62 further has, in addition to the first arm end 63 and the second arm end 64, the arm body 66 extending substantially in the vehicle width direction and joined to the first arm end 63 and the second arm end 64. The outer end of the arm body 65 of the front arm 61 in the vehicle width direction and the outer end of the arm body 66 of the rear arm 62 in the vehicle width direction are joined together, and are integrally joined to the common first arm end 63.

The bracket 7 is joined to the arm body 66 of the rear arm 62. More specifically, the bracket 7 is joined across a portion from the joined portion, at which the arm body 66 of the rear arm 62 and the arm body 65 of the front arm 61 are joined together, to a portion of the rear arm 62 on the inner side in the vehicle width direction with respect to the joined portion. The bracket 7 is located on the arm body 66 so as to protrude upward from the arm body 66. Specifically, the bracket 7 is located on an upper surface of the arm body 66. The bracket 7 is located at an outer end portion of the arm body 66 in the vehicle width direction. More specifically, the bracket 7 is located, on the outer side in the vehicle width direction, at a position adjacent to the first arm end 63. The bracket 7 is located, on the inner side in the vehicle width direction, on a portion of the arm body 66 independently extending from the arm body 65.

The bracket 7 has a first plate 71 and a second plate 72 standing on the arm body 66 and a third plate 73 coupling an upper end of the first plate 71 and an upper end of the second plate 72 to each other. The first plate 71 and the second plate 72 face each other with a clearance therebetween. The third plate 73 is inclined downward toward the outer side in the vehicle width direction. That is, the third plate 73 is inclined downward from the inner side toward the outer side in the vehicle width direction. The third plate 73 is not coupled across the entire upper end of the first plate 71 and the entire upper end of the second plate 72, but is coupled to part of the upper end of the first plate 71 and part of the upper end of the second plate 72. Specifically, the third plate 73 is coupled to a portion of the upper end of the first plate 71 and a portion of the upper end of the second plate 72 closer to the first arm end 63. The third plate 73 is not coupled to an inner portion of the upper end of the first plate 71 and an inner portion of the upper end of the second plate 72 in the vehicle width direction. That is, the bracket 7 has a cutout 74 defined by the edges of the first plate 71, the second plate 72, and the third plate 73. The bracket 7 is joined to the arm body 66 by welding.

As shown in FIG. 3, the lower end 42a of the shock absorber 42 is located between the first plate 71 and the second plate 72. The first plate 71 and the second plate 72 support the lower end 42a of the shock absorber 42 such that the lower end 42a is rotatable about a predetermined rotation axis C. The lower end 42a of the shock absorber 42 is located in the cutout 74 of the bracket 7. That is, the shock absorber 42 does not contact the third plate 73 when rotating about the rotation axis C. The lower end 42a of the shock absorber 42 partially overlaps with the rear arm 62 when viewed in the up-down direction.

As shown in FIGS. 5 and 6, the rear arm 62 is configured such that an inner portion in the vehicle width direction with respect to a portion attached to the shock absorber 42 curves in a downwardly-raised shape. Specifically, the arm body 66 of the rear arm 62 has a curve 66a curving in a downwardly-raised shape. That is, the bracket 7 is located between the curve 66a of the rear arm 62 and the first arm end 63.

As shown in FIG. 3, the rear arm 62 is located at the front of the steering tie rod 94. That is, the rear arm 62 and the steering tie rod 94 are aligned in the front-rear direction. When viewed in the vehicle front-rear direction, the rear arm 62 at least partially overlaps with the steering tie rod 94. Note that the rear arm 62 swings in response to extension and contraction of the shock absorber 42, and therefore, there may be a situation where the rear arm 62 does not overlap with the steering tie rod 94 when viewed in the vehicle front-rear direction.

When the front wheel 2 receives impact from the road surface, the impact is transmitted, in the suspension 4 configured in this manner, to the shock absorber 42 and the coil spring 43 via the suspension arm 41. The shock absorber 42 and the coil spring 43 contract to absorb and damp the impact. At this point, the suspension arm 41 swings relative to the vehicle body frame 1 in response to contraction of the shock absorber 42 and the coil spring 43. At this point, the suspension arm 41 receives reactive force from the shock absorber 42.

Specifically, the reactive force from the shock absorber 42 acts on the suspension arm 41. The shock absorber 42 is not attached to the coupled portion between the front arm 61 and the rear arm 62, but is attached to either one of the front arm 61 or the rear arm 62. Thus, stiffness for supporting the shock absorber 42 is improved. If the shock absorber 42 is located between the front arm 61 and the rear arm 62 in the front-rear direction, the front arm 61 and the rear arm 62 may be partially coupled to each other via, e.g., a plate, and the shock absorber 42 may be attached to such a plate. In this configuration, the reactive force from the shock absorber 42 acts on the plate. For this reason, the stiffness of the plate or joint strength between the plate and the front and rear arms 61, 62 needs to be improved to be resistant against the reactive force from the shock absorber 42. However, the front arm 61 or the rear arm 62 itself has a relatively-high stiffness. In this example, the shock absorber 42 is attached to the rear arm 62 so that the rear arm 62 can be strong enough to receive the reactive force from the shock absorber 42.

When viewed in the up-down direction, the lower end 42a of the shock absorber 42 partially overlaps with the rear arm 62. With this configuration, the rear arm 62 can receive, from below; the reactive force acting from above from the shock absorber 42.

The shock absorber 42 is attached to the rear arm 62 via the bracket 7. The shock absorber 42 is attached to the arm body 66 from above. The bracket 7 is located on the arm body 66 so as to protrude upward from the arm body 66. With the bracket 7, the lower end 42a of the shock absorber 42 is separated upward from the arm body 66. When the suspension arm 41 swings, an angle between the rear arm 62 and the shock absorber 42 changes. Since the lower end 42a of the shock absorber 42 is separated from the arm body 66, contact between the rear arm 62 and the shock absorber 42 when the angle between the rear arm 62 and the shock absorber 42 decreases can be prevented.

The bracket 7 is joined across the portion from the joined portion, at which the arm body 66 of the rear arm 62 and the arm body 65 of the front arm 61 are joined together, to the portion of the rear arm 62 on the inner side in the vehicle width direction with respect to the joined portion. That is, the bracket 7 and the knuckle 3 are slightly separated from each other. Thus, a distance between the lower end 42a of the shock absorber 42 and the knuckle 3 is ensured. As a result, when the suspension arm 41 swings, contact between the shock absorber 42 and the front wheel 2 can be prevented.

The first plate 71 and the second plate 72 of the bracket 7 sandwiching and supporting the shock absorber 42 are coupled to each other via the third plate 73. With this configuration, the stiffness of the bracket 7 is improved, and accordingly, the stiffness for supporting the shock absorber 42 is improved. In addition, the third plate 73 is inclined downward toward the outer side in the vehicle width direction. That is, the third plate 73 is inclined from the inner side toward the outer side in the vehicle width direction so as to approach the first arm end 63. With the third plate 73, the load of the knuckle 3 can be easily transmitted to the shock absorber 42.

Figure 7:
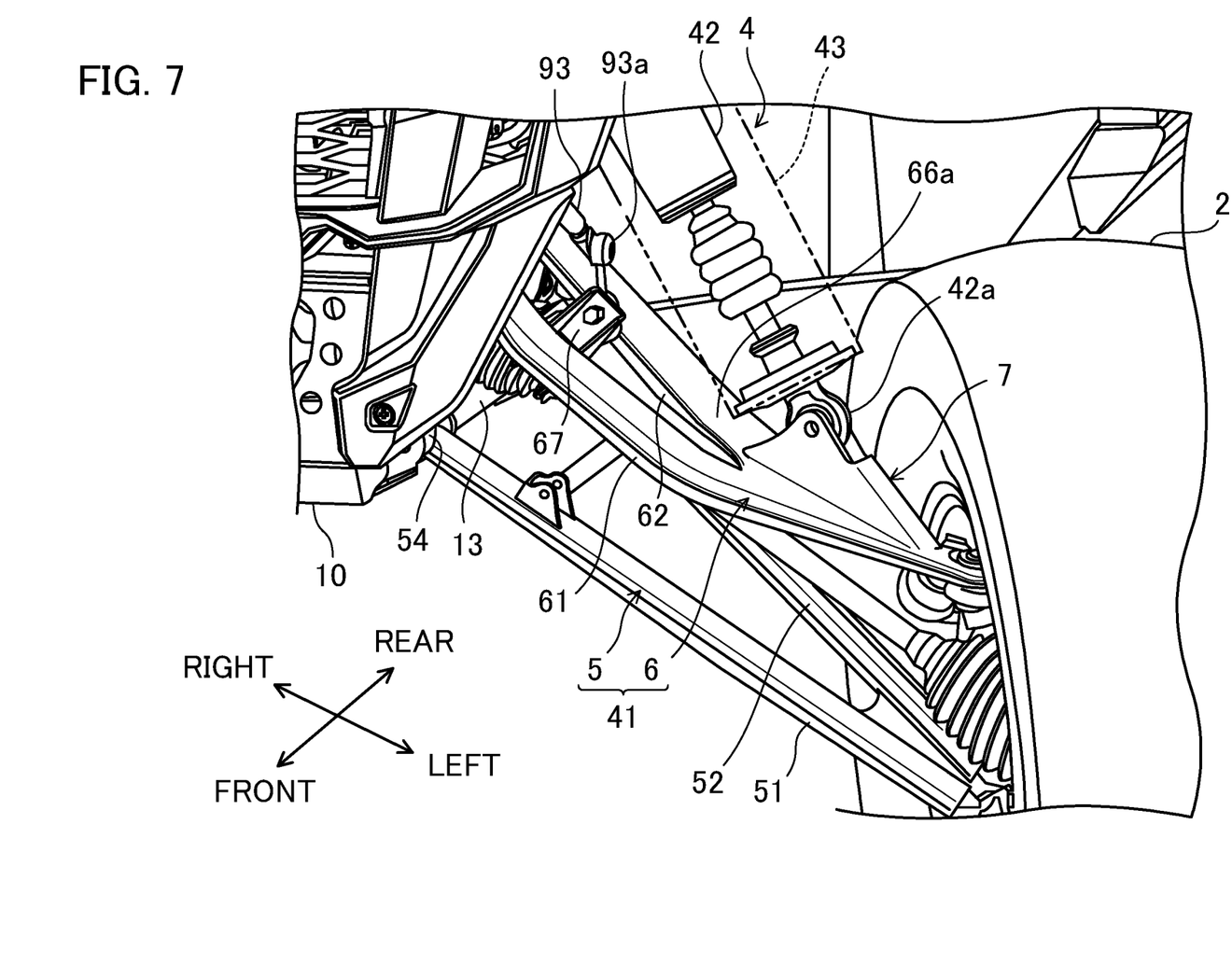
FIG. 7 is a perspective view of a suspension in a state in which the front wheel has been steered to an outer side and a suspension arm has swung downward.

Since the rear arm 62 has the curve 66a, contact between the suspension arm 41 and the shock absorber 42 can be prevented when the shock absorber 42 extends and contacts and the suspension arm 41 swings accordingly. FIG. 7 is a perspective view of the suspension 4 in a state in which the front wheel 2 has been steered to the outer side and the suspension arm 41 has swung downward. Specifically, when the suspension arm 41 swings, an angle between the upper arm 6 and the shock absorber 42 changes. For example, when the shock absorber 42 extends and the upper arm 6 swings downward accordingly, the angle between the rear arm 62 and the shock absorber 42 decreases. That is, the rear arm 62 and the shock absorber 42 approach each other. The curve 66a is positioned on the inner side in the vehicle width direction with respect to the portion of the rear arm 62 to which the shock absorber 42 is attached, and is also a portion approaching the shock absorber 42 when the angle between the rear arm 62 and the shock absorber 42 decreases. The curve 66a curves in the downwardly-raised shape, and therefore, a distance between the shock absorber 42 and the curve 66a is ensured. Accordingly, contact between the rear arm 62 and the shock absorber 42 when the angle between the rear arm 62 and the shock absorber 42 decreases can be prevented.

The lower end 42a of the shock absorber 42 is attached to the bracket 7, and therefore, is located on the inner side in the vehicle width direction with respect to the first arm end 63. With this configuration, a distance between the lower end 42a of the shock absorber 42 and the front wheel 2 is ensured. For example, when the front wheel 2 is steered to the outer side, the front wheel 2 approaches the shock absorber 42. The lower end 42a of the shock absorber 42 is separated to the inner side in the vehicle width direction from the first arm end 63, and therefore, contact with the steered front wheel 2 is prevented.

In addition, the shock absorber 42 is attached to the rear arm 62, and therefore, a space is ensured at the rear of the upper arm 6. That is, as compared to a configuration in which the shock absorber 42 is located between the front arm 61 and the rear arm 62 in the front-rear direction, the upper arm 6 is offset slightly forward with respect to the shock absorber 42. Using the space at the rear of the upper arm 6, other components can be located. In this example, the steering tie rod 94 is located in the space at the rear of the upper arm 6. As a result, the upper arm 6 and the steering tie rod 94 can be located compactly.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The upper arm 6 is not necessarily the so-called A-arm. For example, the front arm 61 and the rear arm 62 of the upper arm 6 are not necessarily joined to each other, and may be independent of each other.

The shock absorber 42 may be attached to the front arm 61.

The shape of the arm, such as the rear arm 62, to which the shock absorber 42 is attached is not limited to the above-described shape. For example, the rear arm 62 does not necessarily have the curve 66a.

The component located in the space at the rear of the rear arm 62 is not limited to the steering tie rod 94. For example, a reservoir tank, a brake hose, or an electrical component harness of the suspension may be located.

Figure 8:
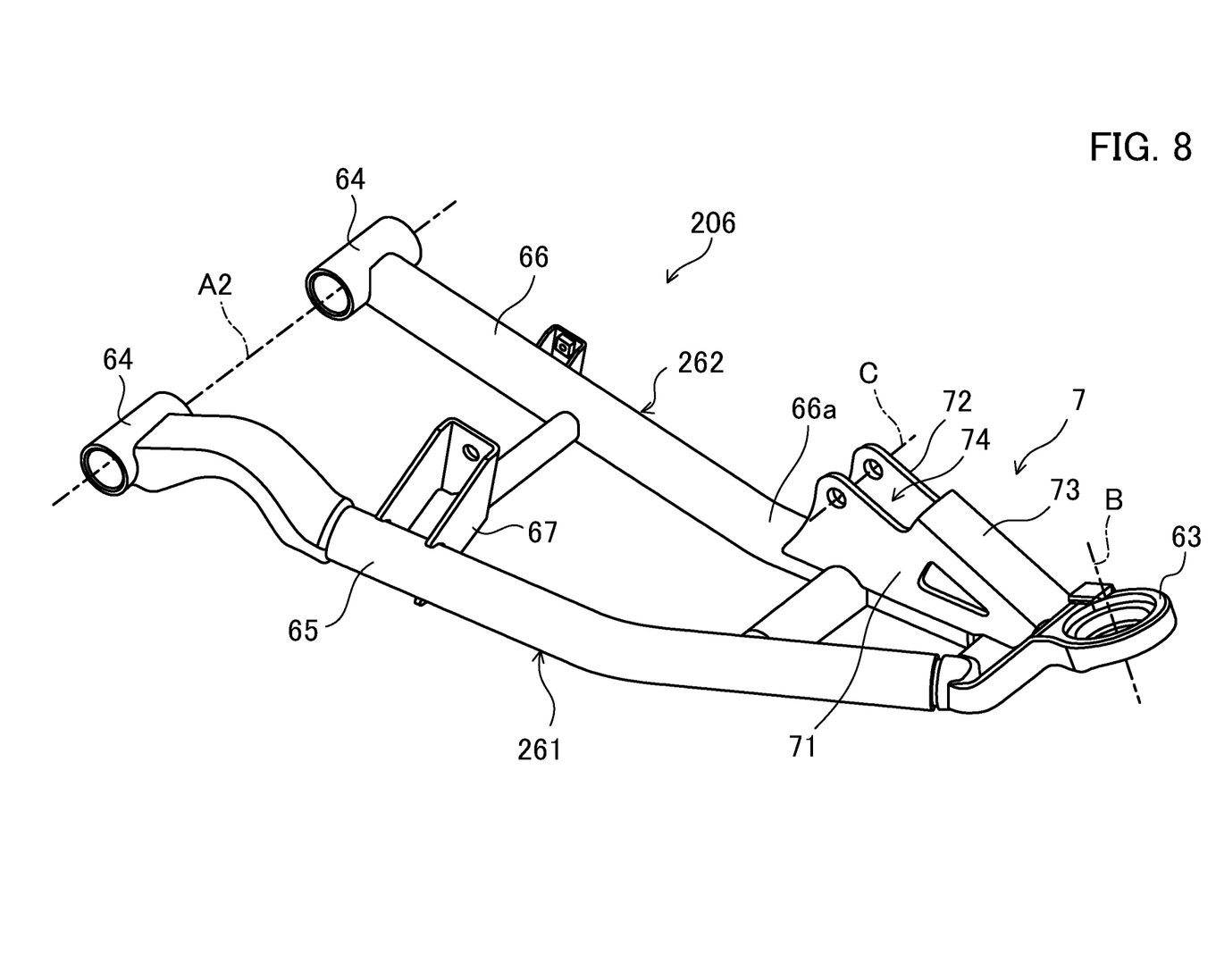
FIG. 8 is a perspective view of an upper arm according to another embodiment.

Each of the lower arm 5 and the upper arm 6 is not limited to one manufactured using the two divided bodies to be joined to each other. For example, each of the lower arm 5 and the upper arm 6 may be manufactured using a pipe. FIG. 8 is a perspective view of an upper arm 206 according to another embodiment. Similar reference numerals are used to represent elements of the upper arm 206 similar to those of the upper arm 6, and description thereof will be omitted. A front arm 261 and a rear arm 262 of the upper arm 206 are formed of pipes. The bracket 7 is joined to the rear arm 262 by welding. The shock absorber 42 is attached to the rear arm 262 via the bracket 7.

The technique of the present disclosure as described above will be summarized as follows.

[1] The suspension 4 includes the suspension arm 41 that couples the knuckle 3 to the vehicle body frame 1, and the shock absorber 42 that is attached to the suspension arm 41. The suspension arm 41 includes the lower arm 5 and the upper arm 6 located higher than the lower arm 5. The upper arm 6 has the front arm 61 and the rear arm 62 located at the rear with respect to the front arm 61. The lower end 42a of the shock absorber 42 is attached to one of the front arm 61 or the rear arm 62.

According to this configuration, the stiffness for supporting the shock absorber 42 can be improved. For example, in the configuration in which the shock absorber 42 is attached to, e.g., the plate partially coupling the front arm 61 and the rear arm 62 to each other, the stiffness of the plate or the joint strength between the plate and the front and rear arms 61, 62 needs to be improved. However, the front arm 61 or the rear arm 62 itself has a relatively-high stiffness. The lower end 42a of the shock absorber 42 is attached to the front arm 61 or the rear arm 62 so that the stiffness for supporting the shock absorber 42 can be improved with a simple configuration.

[2] In the suspension 4 of [1], the lower end 42a of the shock absorber 42 is attached to the rear arm 62.

According to this configuration, as compared to the configuration in which the shock absorber 42 is located between the front arm 61 and the rear arm 62 in the front-rear direction, the position of the rear arm 62 in the front-rear direction shifts forward. Thus, the space for locating the other components is ensured at the rear of the rear arm 62.

[3] In the suspension 4 of [1] or [2], the rear arm 62 is located at the front of the steering tie rod 94, and the rear arm 62 and the steering tie rod 94 are aligned in the front-rear direction.

According to this configuration, the steering tie rod 94 is located in the space at the rear of the rear arm 62. The upper arm 6 and the steering tie rod 94 can be located compactly.

[4] In the suspension 4 of any one of [1] to [3], the rear arm 62 at least partially overlaps with the steering tie rod 94 when viewed in the vehicle front-rear direction.

According to this configuration, the rear arm 62 and the steering tie rod 94 are partially located at the same height position. That is, the space for locating the upper arm 6 and the steering tie rod 94 can be compactified in the up-down direction.

[5] In the suspension 4 of any one of [1] to [4], the one, to which the shock absorber 42 is attached, of the front arm 61 or the rear arm 62 has the arm body 66 and the bracket 7 to which the lower end 42a of the shock absorber 42 is attached, and the bracket 7 is located on the arm body 66 so as to protrude upward from the arm body 66.

According to this configuration, the lower end 42a of the shock absorber 42 is separated upward from the arm body 66 by an amount corresponding to the bracket 7. That is, a distance between the lower end 42a of the shock absorber 42 and the arm body 66 is ensured. Thus, when the suspension arm 41 swings, contact between the arm body 66 and the shock absorber 42 is prevented.

[6] In the suspension 4 of any one of [1] to [5], the one, to which the shock absorber 42 is attached, of the front arm 61 or the rear arm 62 has the arm body 66 and the bracket 7 to which the lower end 42a of the shock absorber 42 is attached. The bracket 7 has the first and second plates 71, 72 standing on the arm body 66 and the third plate 73 coupling the upper end of the first plate 71 and the upper end of the second plate 72 to each other. The lower end 42a of the shock absorber 42 is located between the first plate 71 and the second plate 72, and is supported by the first plate 71 and the second plate 72. The third plate 73 is inclined downward toward the outer side in the vehicle width direction.

According to this configuration, the bracket 7 is configured such that the upper ends of the first and second plates 71, 72 supporting the shock absorber 42 are coupled to each other via the third plate 73. That is, the first plate 71, the second plate 72, and the third plate 73 are configured such that the section of the bracket 7 is substantially in a C-shape. With this configuration, the stiffness of the bracket 7 is improved. Further, the third plate 73 is inclined so as to approach the outer end of the arm from the inner side toward the outer side in the vehicle width direction. The outer end of the arm supports the knuckle 3. The load of the knuckle 3 acts on the outer end of the arm and is transmitted to the third plate 73, and therefore, is easily transmitted to the shock absorber 42.

[7] In the suspension 4 of any one of [1] to [6], of the one, to which the shock absorber 42 is attached, of the front arm 61 or the rear arm 62, the portion on the inner side in the vehicle width direction with respect to the portion to which the shock absorber 42 is attached curves in the downwardly-raised shape.

According to this configuration, when the arm swings, contact between the arm and the shock absorber 42 is prevented. In this example, the rear arm 62 has the curve 66a on the inner side in the vehicle width direction with respect to the portion to which the shock absorber 42 is attached. The shock absorber 42 is attached to the rear arm 62 from above. When the rear arm 62 swings, the angle between the rear arm 62 and the shock absorber 42 may decrease, and the rear arm 62 and the shock absorber 42 may approach each other accordingly. The curve 66a is positioned, at the rear arm 62, on the inner side in the vehicle width direction with respect to the shock absorber 42, and may approach the shock absorber 42 when the angle between the rear arm 62 and the shock absorber 42 decreases. Since the curve 66a curves in the downwardly-raised shape, the distance between the curve 66a and the shock absorber 42 is ensured. As a result, contact between the rear arm 62 and the shock absorber 42 is prevented.

[8] In the suspension 4 of any one of [1] to [7], the lower end 42a of the shock absorber 42 partially overlaps with the one, to which the shock absorber 42 is attached, of the front arm 61 or the rear arm 62 when viewed in the up-down direction.

According to this configuration, the lower end 42a of the shock absorber 42 is attached to the arm with partially overlapping with the arm in the up-down direction. Thus, the arm can reliably receive the load in the up-down direction from the shock absorber 42.

[9] The utility vehicle 100 (off-road vehicle) includes the front wheel 2, the knuckle 3 that supports the front wheel 2, and the suspension 4 that couples the knuckle 3 to the vehicle body frame 1. The suspension 4 includes the suspension arm 41 that couples the knuckle 3 to the vehicle body frame 1, and the shock absorber 42 that is attached to the suspension arm 41. The suspension arm 41 has the lower arm 5 and the upper arm 6 located higher than the lower arm 5. The upper arm 6 has the front arm 61 and the rear arm 62 located at the rear with respect to the front arm 61. The lower end 42a of the shock absorber 42 is attached to one of the front arm 61 or the rear arm 62.

According to this configuration, the suspension 4 is applied to the front wheel 2 of the vehicle 100. As described above, the stiffness for supporting the shock absorber 42 can be improved by application of the suspension 4. The front arm 61 or the rear arm 62 itself has a relatively-high stiffness. The lower end 42a of the shock absorber 42 is attached to the front arm 61 or the rear arm 62 so that the stiffness for supporting the shock absorber 42 can be improved with a simple configuration.

What is claimed:

1. A suspension comprising:
a suspension arm that couples a knuckle to a vehicle body frame; and
a shock absorber that is attached to the suspension arm, wherein:
the suspension arm includes a lower arm and an upper arm located higher than the lower arm,
the upper arm has a front arm including a hollow arm body, a rear arm including a hollow arm body and located at a rear with respect to the front arm and a joined portion at which the front arm and the rear arm are joined to form a single contiguous hollow body, the joined portion being hollow,
a lower end of the shock absorber is attached to a bracket,
the bracket is attached to both the hollow arm body of one of the front arm or the rear arm and the joined portion, and
a portion on an inner side of the hollow arm body of one of the front arm and the rear arm in a vehicle width direction with respect to the bracket curves in a downwardly-raised shape.

2. The suspension of claim 1, wherein
the lower end of the shock absorber is attached to the rear arm.

3. The suspension of claim 2, wherein
the rear arm is located at a front of a steering tie rod, and the rear arm and the steering tie rod are aligned in a front-rear direction.

4. The suspension of claim 2, wherein
the rear arm at least partially overlaps with a steering tie rod when viewed in a vehicle front-rear direction.

5. The suspension of claim 1, wherein
the bracket is located on the arm body of one of the front arm and the rear arm so as to protrude upward from the arm body of one of the front arm and the rear arm.

6. The suspension of claim 1, wherein
the bracket has first and second plates standing on the arm body of one of the front arm and the rear arm and a third plate coupling part of an upper end of the first plate and part of an upper end of the second plate to each other, the lower end of the shock absorber is located between the first plate and the second plate, and is supported by the first plate and the second plate, and
the third plate is inclined downward toward an outer side in the vehicle width direction.

7. The suspension of claim 6, wherein
the upper arm has an arm end at which an outer end of the front arm in the vehicle width direction and an outer end of the rear arm in the vehicle width direction are joined to each other, and
the third plate is coupled to a portion of the upper end of the first plate and a portion of the upper end of the second plate closer to the arm end.

8. The suspension of claim 1, wherein
the lower end of the shock absorber partially overlaps with the one, to which the shock absorber is attached, of the front arm or the rear arm when viewed in an up-down direction.

9. A suspension comprising:
a suspension arm that couples a knuckle to a vehicle body frame; and
a shock absorber that is attached to the suspension arm, wherein the suspension arm includes a lower arm and an upper arm located higher than the lower arm,
the upper arm has a front arm, a rear arm located at a rear with respect to the front arm, a joined portion at which the front arm and the rear arm are joined together, and a cross member joined to each the front arm and the rear arm,
the rear arm includes an arm body which is hollow and a bracket which is joined to the arm body and to which a lower end of the shock absorber is attached, and
the bracket is located at least from the joined portion over a portion of the rear arm to which the cross member is joined,
wherein:
the bracket includes a concave portion which corresponds in shape to the cross member,
the concave portion of the bracket is over the cross member.

* * * * *